United States Patent
Briscoe, Jr. et al.

(10) Patent No.: US 6,390,378 B1
(45) Date of Patent: May 21, 2002

(54) CENTRALIZED HUMIDIFICATION CONTROLLED CONTAINER SYSTEM FOR TRANSPORTING AND HOLDING PERISHABLE GOODS

(75) Inventors: Charles Eugene Briscoe, Jr., Cincinnati; Peter Herlihy, Hamilton; Russell Baker, Jr., Cincinnati, all of OH (US)

(73) Assignees: CA Global Express, LLC; Nitec,LLC, Cincinnati, both of OH (US)

(*) Notice: Subject to any disclaimer, the term of this patent is extended or adjusted under 35 U.S.C. 154(b) by 0 days.

(21) Appl. No.: 09/241,586

(22) Filed: Feb. 2, 1999

(51) Int. Cl.⁷ .............................. B01F 3/02; G05D 21/00
(52) U.S. Cl. .......................... 236/44 C; 34/210; 62/78; 236/51
(58) Field of Search ................. 236/51, 44 R, 236/44 C; 34/210; 165/212; 62/299 F, 408, 407, 448, 309, 78, 314

(56) References Cited

U.S. PATENT DOCUMENTS

| | | | |
|---|---|---|---|
| 1,592,718 A | * 7/1926 | Browne | 62/314 X |
| 3,440,834 A | * 4/1969 | Hirai et al. | 62/404 |
| 3,694,925 A | 10/1972 | Coyle et al. | 34/46 |
| 3,940,062 A | 2/1976 | Rainey | 239/56 |
| 3,961,925 A | 6/1976 | Rhoad | 62/376 |
| 4,003,728 A | 1/1977 | Rath | 62/78 |
| 4,090,370 A | * 5/1978 | Vaughan | 62/314 X |
| 4,655,048 A | 4/1987 | Burg | 62/78 |
| 4,808,303 A | 2/1989 | Edwards et al. | 210/138 |
| 4,884,411 A | 12/1989 | Wallace et al. | 62/91 |
| 5,037,459 A | 8/1991 | Spruill et al. | 55/387 |
| 5,127,233 A | 7/1992 | Coffield | 62/78 |
| 5,333,394 A | 8/1994 | Herdeman et al. | 34/467 |
| 5,400,612 A | * 3/1995 | Hedges | 62/309 X |
| 5,529,177 A | 6/1996 | Podd et al. | 206/204 |
| 5,564,287 A | * 10/1996 | Hearne, Jr. et al. | 62/309 X |
| 5,649,995 A | 7/1997 | Gast, Jr. | 95/12 |
| 5,762,661 A | 6/1998 | Kleinberger et al. | 55/227 |
| 5,799,495 A | 9/1998 | Gast, Jr. et al. | 62/78 |

\* cited by examiner

Primary Examiner—William Wayner
(74) Attorney, Agent, or Firm—Benesch, Friedlander Coplan & Aronoff, LLP (57) ABSTRACT

A centralized humidification controlled container system including one or more containers to confine perishable goods in a humidification controlled environment, a portable master unit container which confines the controlling equipment with a source of humidification water, and means of connecting the master unit container to each of the perishable goods containers in such a way as to pass information and fluid between the master unit container and each attached perishable goods container.

16 Claims, 7 Drawing Sheets

CENTRALIZED HUMIDIFICATION CONTROLLED CONTAINER SYSTEM FOR TRANSPORTING AND HOLDING PERISHABLE GOODS

FIELD OF INVENTION

The present invention generally relates to a humidification system and methods in conjunction with other environmental control systems for maintaining and controlling the humidity content in perishable goods containers during transport and holding. This invention further relates to a portable centralized master unit container for performing the humidification operations in one or more portable perishable goods containers.

BACKGROUND OF THE INVENTION

It is generally well understood and widely accepted that it is desirable to prevent deterioration of the quality, quantity and appearance of consumable perishable goods, such as fresh fruits, vegetables, cheeses, meats, fish and the like, during lengthy transportation and holding operations, up to their final arrival in the global market.

Moreover, some foodstuffs, such as fruits and vegetables (e.g., broccoli) that must be shipped long distances to market (e.g., from Asia to North America) are shipped packed in crushed ice in the shipping container. As a consequence, less foodstuffs can be placed in the container because the crushed ice takes up part of the weight limit and available space in the container. The ice has been used not only for refrigeration, but also for humidification. Replacement of the crushed ice with a suitable system for a refrigerated and humidified atmospheric control allows for a significant increase (e.g., 30% to 50%) in the amount of foodstuffs that can be shipped in a container.

Preservation of moisture in perishable goods is a critical aspect of prevention of deterioration of perishable goods. Coyle et al. in U.S. Pat. No. 3,694,925 recognized this and understood that the actual process of refrigeration of perishable goods in railroad cars reduces the moisture content in the atmosphere around the goods, and within the goods, to an undesirable level. The solution proposed by Coyle et al. was to convey a portion of the condensed water from refrigeration to the intake of the circulating fan, while draining off the remainder of the water. This approach obviously resulted in considerable dehydration of the goods, and would not meet the current requirements of today's markets.

Rainey, in U.S. Pat. No. 3,940,062, attempted to improve the situation by packaging moisture pods with the perishable goods in a stagnant environment.

Rhoad, in U.S. Pat. No. 3,961,925, devised a very elaborate means for spraying a recycled liquid coolant, such as chilled brine, directly onto the perishable goods during transportation and storage, to address the needs of cooling and humidification without success.

Rath, in U.S. Pat. No. 4,003,728, specifically targeted product spoilage through dehydration caused by refrigeration systems recycling dried air around the perishable goods. Rath provided an opportunity for condensate from the refrigeration system to be absorbed by the stream of circulated air. In this regard, Rath provided a humidity sensor in the ducted stream of air coming into the cargo container and passing through a duct along the bottom of the container and up through vents. This duct also contained condensate, and excess was disposed of through floor drains. The air moved upward around the goods and was collected by a return duct and passed into the front equipment section and downward through the refrigeration (or heating) unit. One problem with Rath's approach is that if the relative humidity sensor reading dropped below the stated value (preferably 80% relative humidity), only an alarm would be lighted. Such an alarm was not likely to be seen deep in a cargo hold of a ship, or by a driver of a truck, or by a railroad engineer, and, if not seen, no positive action could be taken. A second problem was that the position of Rath's moisture sensor was located only a few inches above the surface of water from condensation collected in the duct and quite likely never dropped below a reading of 80% relative humidity, regardless of a much lower humidity level around goods at the top or middle of the cargo. A third problem is that Rath notes excess water that collected in the duct was drained from the cargo container through a floor vent. Since this water came from the perishable goods, Rath's process was also dehydrating the goods to a considerable extent. It is further noted that Rath's system has poor humidity pick up from the surface of the water (i.e., negligible quantities of moisture would be reabsorbed by the circulating air stream) at the low temperatures the refrigerated perishable goods containers will operate, due to the low water vapor pressure and the relatively low surface area of the water-atmosphere interface.

Burg, in U.S. Pat. No. 4,655,048, describes a hypobaric preservation of non-respiring animal matter by contacting the storage atmosphere with a body of heated water and very carefully controlled pressures slightly less than the vapor pressure of water at the storage temperature in sealed containers. Such an approach simply is not practical for bulk transport and holding of perishable goods.

Edwards, in U.S. Pat. No. 4,808,303, describes a produce hydration system for use in display racks in which water is carefully filtered, pressurized and efficiently sprayed or misted over the surface of exposed produce in display racks. While providing interesting technology related to spraying, Edwards fails to teach how to maintain proper humidification during transportation and holding of perishable goods.

Wallace, in U.S. Pat. No. 4,884,411, describes a high humidity refrigeration apparatus that is fitted into one end of a shipping container. At the top of a vertical casing or duct is a water spray assembly. Below the casing or duct is a cooling section, below which is mounted a heating section, below which is a water reservoir. Water is pumped from the reservoir to the spray assembly from which it falls on the cooling section and then on to the heated section. Air enters this unit just above the water level in the reservoir, and passes upward over the heating section where it is warmed and can pick up humidity. The air is then passed up over the cooled section where it is cooled and excess water is condensed from the air and falls back to the reservoir. The air then continues upward past the spray assembly and on to the produce section in a horizontal direction and is brought off the top and is cycled back to repeat the process. Those familiar with thermodynamics will recognize the process could achieve saturated, cooled air if the flow rate of the air were slow enough relative to the size of the heating and cooling sections; however, the energy efficiency in doing so would be very poor and the capacity of the system would be limited to low demands for cooling and humidification. Transportation costs of perishable goods would be high because of the required large size and weight of the unit relative to the mass of cargo it can service.

Spruill, in U.S. Pat. No. 5,037,459, teaches the use of a quantity of a salt solution in communication with the atmosphere in a substantially closed container to maintain a desired level of humidity. The required bulk and weight of such a solution would be prohibitive for portable perishable goods containers in regards to both cost and space.

Coffield, in U.S. Pat. No. 5,127,233, teaches moisture recovery from compressed air by means of a filter. Such moisture is then supplied to the atmosphere around the foodstuffs. This method is energy inefficient, and is not the subject of the instant invention.

Podd et al., in U.S. Pat. No. 5,529,177, teaches the use of saturated desiccant panels for gradually releasing humidity in containers. This method is a very weight intensive approach to transportation containers, and lacks the immediate control for supplying humidity on demand.

Kleinberger et al., in U.S. Pat. No. 5,762,661, describes a way to refine a mist in a humidification system. Such refinements are not a part of the instant invention.

Fractal, Inc., according to their product specification sheet, offers a state-of-the-art humidification system using air atomization nozzles, oil-less food grade compressors and humidistat sensors that are accurate to plus or minus 2% up to 98% relative humidity. This system produce a humidity plume which is readily absorbed into the atmosphere and the system comes pre-assembled. However, the design of the system does not include certain environmental aspects that are included in the instant invention. Nor does the Fractal unit lend itself to the integrated design efficiencies and improvements of the instant invention. Further, the Fractal system is not designed to be portable or used in conjunction with shipping, cargo or transportation containers.

The Rath patent, U.S. Pat. No. 4,003,728 cited earlier, disclosed one step in an integrated system for environmental control of perishable goods during transportation. In this regard, Rath describes a plurality of portable individual containers connected to a central portable container which supplied electrical services to the individual cargo containers and monitored the temperature and humidity therein with a recording device. However, Rath does not contemplate or anticipate the design improvements embodied in the instant invention.

Herdeman et al., in U.S. Pat. No. 5,333,394, also describes a system which included a plurality of containers to be connected from time to time to a central source of controlled atmosphere which supplies a controlled atmosphere, gaseous by nature, to at least one of the shipping containers for perishable goods. This patent neither contemplates nor anticipates the improvement in total design efficiency of the instant invention which generates the required humidity source in the individual containers of perishable goods from a liquid source and can service the humidity needs of all attached containers simultaneously without having to assign priorities to specific containers.

Gast, Jr. et al, in U.S. Pat. No. 5,799,495, extends the teachings of the Herdeman et al. patent, U.S. Pat. No. 5,333,394, to a system for transporting and ripening perishable goods in which the oxygen and nitrogen content of individual perishable goods containers are controlled by delivering a specific composition of nitrogen and oxygen from a central atmospheric generation container to each of the attached perishable goods containers. In this patent, Gast, Jr. also extends the teachings of his earlier patent, U.S. Pat. No. 5,649,995, which used a nitrogen generation system to provide controlled levels of nitrogen and oxygen in a container for perishable goods. In neither of these patents does Gast, Jr. contemplate or anticipate the improvement in total design efficiency in the instant invention which generates the required humidity and control for further improving the environment for perishable goods during transportation, holding and ripening.

The present invention addresses these and other problems and deficiencies of prior art systems.

SUMMARY OF THE INVENTION

According to the present invention there is provided a centralized humidification container system comprising one or more containers to confine perishable goods in a humidity controlled environment, a portable master unit container which houses the controlling equipment with a source of humidification water, and includes means for connecting the master unit container to each of the perishable goods containers to pass information and fluid between the master unit container and each attached perishable goods container. This centralized humidification controlled container system is synergistic with other systems which control other aspects of the environment in the perishable goods container such as temperature, oxygen, carbon dioxide, nitrogen, ethylene, etc. or in also providing services to such containers such as electrical power. The centralized humidification controlled system of the present invention is used in conjunction with any such other system, either singly or in any combination, and is an improvement to previously known means of providing environmental control to perishable goods during transportation and holding.

In accordance with another aspect of the present invention, there is provided a commercial container for confining perishable goods for the purposes of transporting and holding, which contains equipment for thoroughly circulating the internal gaseous atmosphere around the perishable items by means of a system of ducts, vents and returns, and is adapted to include: (a) at least one spray nozzle capable of producing a fine atomized mist or atomized fog of water in the duct system, such that the flow of internal atmospheric gases can be increased in humidity content, (b) at least one sensing means for sensing the humidity content of the internal atmospheric gases, and (c) detection means for detecting whether the internal gaseous atmosphere is being circulated, and may optionally include (d) a condensate recycle line, which in each case is connected to the master unit container through an appropriate conduit.

The conduits may be grouped in various ways within different umbilical cords such as the conduits for fluids collected into a fluid umbilical cord and the conduits for information may be collected into a data umbilical cord, or they may be combined into a single umbilical cord (having one or more fluid lines and a data line), or in any other way which is appropriate. In this way, one or more containers of perishable goods are connected to the master unit container wherein information is processed to determine if a particular perishable goods container requires additional humidity and, if so, water is sprayed from a nozzle in a duct of that container, while the confined atmosphere is being circulated around the perishable items until the target humidity content in that container is achieved. At this point, the spray of water in the duct of that container is interrupted. Potable water that is treated by filtration is supplied to the nozzles from a reservoir located in the master unit container. The potable water may also be chemically treated to inhibit growth of bacteria and the like.

Condensate from a refrigeration system, sea water or other non-potable water can be processed by known means making it suitable for addition to the water reservoir. A manifold within the master unit container is used to direct water to one or more of the perishable goods containers simultaneously.

A centralized or distributed control system processes the information from all humidity sensors, compares the humidity levels to predetermined ranges, determines when the circulating system is operating in the perishable goods container, activates appropriate solenoids, switches, relays, valves, pumps, etc. spraying water only while the circulating system is operating and only to maintain the predetermined humidity limits within a particular container, and optionally can signal for service if a given aspect needs operator attention. In a distributed control system individual controllers can monitor and control such items as sensors and valves.

According to one aspect of the instant invention there is provided a simple and effective way of modifying commercially available portable refrigerated transportation containers currently used for shipping, railroads and trucking for transporting and holding perishable goods, to include humidification and management of the humidity levels for optimum results.

A second aspect of the instant invention collects the humidification support and management in one portable master container that can provide humidification services for one or more perishable goods containers based on existing commercially available components.

A third aspect of the instant invention is a miniaturized version of the master container which can be conveniently attached to the front of a modified existing refrigerated truck, independent of whether it is on the road or transferred to a flatbed rail carrier.

A fourth aspect of the instant invention integrates the novel humidification container system with any and all other known atmospheric control systems for transporting and holding perishable goods that are compatible with or utilize a centralized master unit container attached to one or more cargo containers.

It is an object of the instant invention to provide an improved efficiency humidification system for use in transportation and holding, including ripening operations, of perishable goods in portable containers through use of a master unit distribution container connected to at least one container for perishable goods.

A second objective is to have this improved design synergistic with all state-of-the-art methods and equipment for controlling and maintaining all other atmospheric environments known or anticipated to be useful in transporting and holding perishable goods until they reach global markets.

Another objective of the instant invention is to maximize net value to shippers who need only make minor modifications to existing perishable goods containers to accommodate humidification in concert with a master unit container.

Another objective of this instant invention is to provide a humidification system integrated with other atmospheric control systems for perishable goods being transported or kept in holding, as well as integration into new improved system designs not previously described or contemplated.

A further objective of the instant invention is to maximize the use of the equipment located in the master container unit by having it cycled to a new shipment while actual empty cargo containers are frequently left at some distant location for some time.

A further objective of the instant invention is to provide improved quality and increased quantity of perishable goods to the global markets at reduced cost compared to current methods.

Still other objectives and advantages of the present invention will become apparent to those skilled in the art upon a reading and understanding of the following detailed description, accompanying drawings and appended claims.

BRIEF DESCRIPTION OF THE DRAWINGS

The present invention may take physical form in certain parts and arrangements of parts, a preferred embodiment and method of which will be described in detail in this specification and illustrated in the accompanying drawings which form a part hereof, and are not to be construed as limitations in scope, wherein.

DETAILED DESCRIPTION OF THE PREFERRED EMBODIMENT

Figure 1:
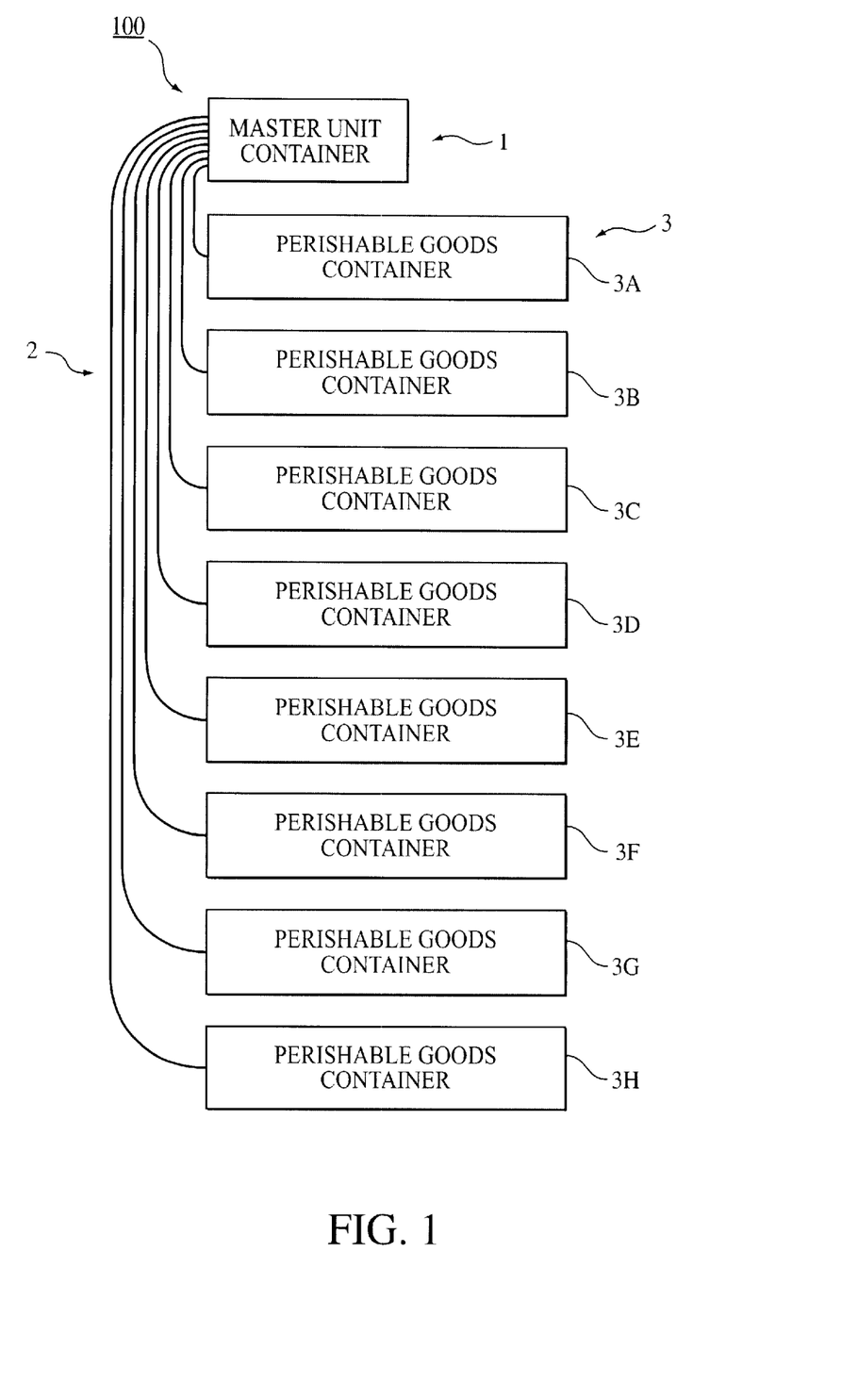
FIG. 1 is a diagrammatic illustration of a centralized humidification controlled container system including one portable master unit container that services eight portable perishable goods containers.

Referring now to the drawings wherein the showings are for the purposes of illustrating a preferred embodiment of the invention only and not for purposes of limiting same, FIG. 1 illustrates a centralized humidification controlled container system 100 which includes a portable master unit container 1 connected to one or more perishable goods containers 3 via a plurality of umbilical cords 2. Containers 1 and 3 include one or more appropriate input/output (I/O) ports for connection with umbilical cord 2. In the embodiment illustrated in FIG. 1, eight (8) perishable goods containers 3A–3H are connected with a single master unit container 1. The number of perishable goods containers shown in FIG. 1 is illustrative of the concept and not intended as a limitation. A preferable number of perishable goods containers is in the range of one (1) to fifty (50), with a more preferable range being ten (10) to thirty (30). It should be understood that one or more umbilical cords 2 may be connected between each of the perishable goods containers 3 and master unit container 1. Components of a humidification system 200 are located in master unit container 1 and perishable goods container 3, as will be described in detail below.

Master unit container 1 may take a variety of suitable forms, including a typical ten (10), twenty (20) or forty (40) foot long commercial shipping container. Likewise, perishable goods containers 3 may also take a variety of suitable forms, including a typical ten (10), twenty (20) or forty (40) foot long commercial perishable goods shipping container. It should be appreciated that in the case where master unit container 1 is mounted on the top front of a refrigerated trailer for a truck, master unit container 1 may have significantly smaller dimensions (e.g., about one (1) foot long). Moreover, it should be understood that containers 1 and 3 may be of the same or different sizes.

Umbilical cords 2 are generally comprised of hoses, tubes, wires, conduits and connectors of appropriate stress tolerance for withstand flexing, abrasion and vibration. Umbilical cord 2, in accordance with a preferred embodiment of the present invention, includes couplers for coupling umbilical cord 2 to containers 1 and 3, a data line 7 for one-way and two-way data communications, and a fluid line 8 for transmitting fluids, such as water and gases, between the abovementioned master unit container 1 and perishable goods containers 3. The couplers facilitate the respective connection/disconnection of umbilical cord 2 to the above mentioned input/output (I/O) ports of containers 1 and 3. Alternatively, umbilical cord 2 may be suitably arranged for permanent connection with containers 1 and 3, or for permanent connection with only one of the containers 1 or 3, and detachable connection with the other container 1 or 3. Examples of suitable umbilical cords are describe in the abovementioned patents issued to Rath (U.S. Pat. No. 4,003,728), Herdeman et al. (U.S. Pat. No. 5,333,394) and Gast Jr. et al. (U.S. Pat. No. 5,799,495), which are fully incorporated herein by reference. Components for such umbilical cords are commercially available and well known to those skilled in the art. Umbilical cords 2 may also be supplemented with optical fibers and optical components, or other wireless components as used in the telecommunication industry for data communications. In cases where the external temperature could drop below the desired temperature within the perishable goods container of the freezing point of water, it is preferably to include a cable heater as a component of the umbilical cord to prevent condensation of moisture from gaseous streams or freezing of water which could block the line. Such flexible line heaters are commercially available and incorporation of such a heater into or about the umbilical cord would be understood by those skilled in the art.

It should be appreciated that container system 100 may be suitably configured to bring condensate water from perishable goods container 3 to master unit container 1 for treatment, before reuse in the humidification process (described below). Accordingly, umbilical cord 2 may also include a return fluid line for transferring fluid from perishable goods container 3 to master unit container 1. A return fluid line allows for a "recirculation loop."

Figure 2:
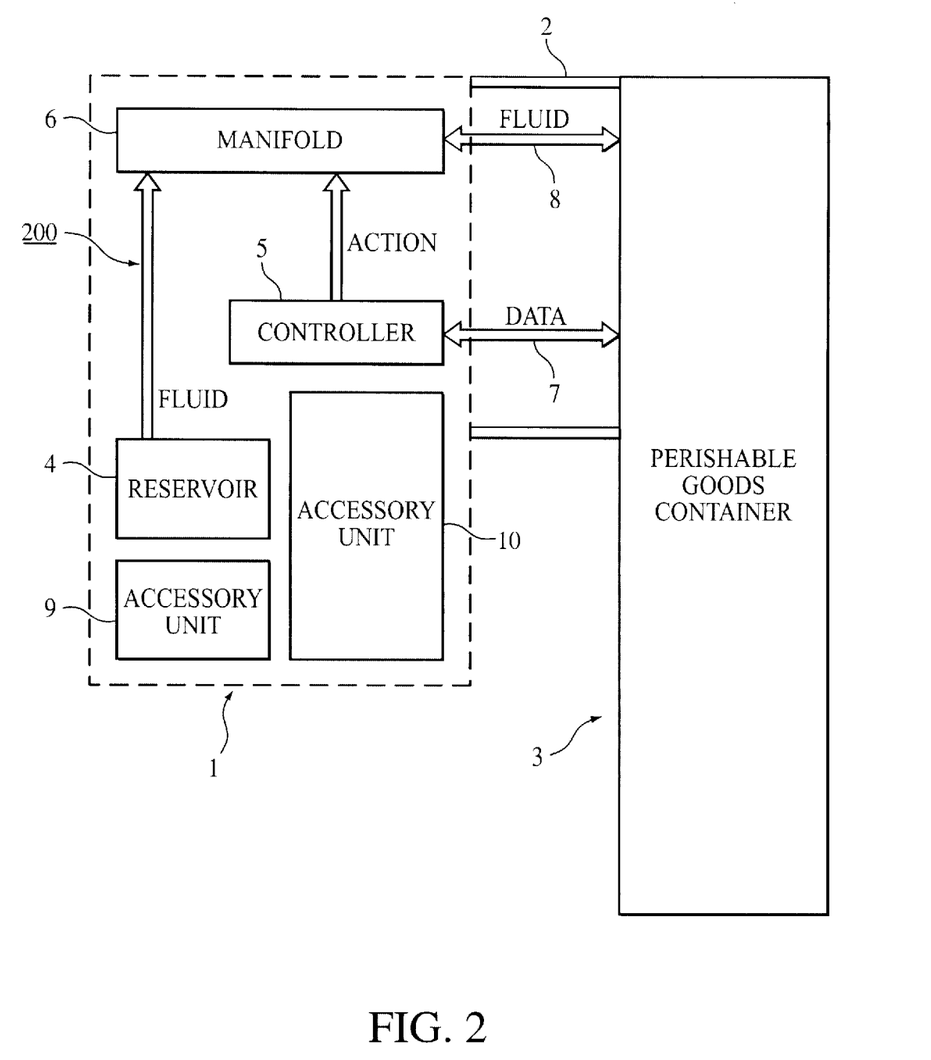
FIG. 2 is a block diagram of a portable master unit container, in accordance with a preferred embodiment of the present invention.

FIG. 2 illustrates the interior of the master unit container 1 as connected with a perishable goods container 3 via umbilical cord 2. Umbilical cord 2 is shown with data line 7 for communicating information between containers 1 and 3, and fluid line 8 for transmitting fluid (e.g., water and/or steam) between containers 1 and 3.

Master unit container 1 is generally comprised of a fluid reservoir 4, a controller 5, a manifold 6 and accessory units 9 and 10. Master unit container 1 also includes appropriate access panels and doors (not shown) for convenient access to the components housed therein.

Fluid reservoir 4 preferably takes the form of a water tank, which provides a reservoir of potable water. The potable water is delivered through manifold 6 to components of humidification system 200 located within perishable goods container 3, as will be described below with reference to FIG. 4.

Manifold 6, in a preferred form, is generally comprised of a solenoid or other automated valve arrangement for controlling fluid flow, as is well known to those skilled in the art. In operation, manifold 6 simultaneously directs fluid to one or more perishable goods container 3 by providing exit ports to the appropriate umbilical cord fluid line. It should be understood that in accordance with a preferred embodiment of the present invention, a heater is provided when the present invention is used in an external low temperature environment. The heater prevents water in the reservoir from freezing as well as tracing all water lines within the container to prevent ice plugging the lines or manifold. Alternatively, a central source of controlled heat, such as an electrical heater, may be incorporated within the master unit container 1 to achieve the same end result.

Controller 5 is preferably comprised of electronic control circuitry (e.g., microcomputer, or programmable logic controller (PLC)) for managing activity through manifold 6 based on the information transferred via data line 7. In particular, controller 5 is a component of humidification system 200 that controls operation thereof, including the activation and deactivation of humidification system 200 in accordance with the desired humidity level in perishable goods container 3. Proper management of humidification system 200 may require controller 5 to periodically interrogate components in perishable goods container 3 to determine when the circulating fan is operating, if a particular nozzle requires service, if the proper temperature is being maintained, etc. In this respect, controller 5 may receive data from a humidity sensor, flow sensor, refrigeration system control panel, contacts from a circulation fan, and the like. Moreover, one skilled in the art will recognize that different types of commercially available sensors can be used, and include but are not limited to the following types of sensors: acoustic, bimetallic, capacitive, electro-optic, infrared, magneto-hydrodynamic, piezoelectric, thermistor, etc. Such sensors are readily available commercially from companies such as Accurate Measurement & Distribution, Inc. and Air Monitor Corporation. In this case, two-way data communications are established via data line 7. In the event of a problem or malfunction in humidification system 200, controller 5 may be used to automatically place a phone call to the proper operator station, or otherwise alert an operator. In this regard, controller 5 may also include an I/O interface for communicating with a telephone system or a remote computer system (e.g., a modem), or the communication may be by wireless devices such as cellular telephony. Moreover, communications may be made via a network of computers (e.g., the Internet).

Moreover, it should be understood that controller 5 may be arranged to manage various valves, pumps (e.g., drainage return pump), relays and solenoids located in perishables goods container 3, such as those readily commercial available from Omega Engineering, Inc., and well understood by those skilled in the art. In addition, controller 5 may be configured to control systems necessary to perform the functions necessary to supply, maintain and manage other atmospheric components, such as nitrogen, oxygen, carbon dioxide, ethylene, etc., temperature and/or electrical power, or independently configured to control one or more functions such as humidity in combination with one or more other controllers to control other functions, such that the desired atmosphere and environment is achieved and maintained for the perishable goods. In such cases, manifold 6 and umbilical cord 2 are suitably configured or duplicated in function to include means for supplying these additional services to perishable goods container 3.

Accessory units 9 and 10 are included to illustrate that master unit container 1 may also include suitable power units, nitrogen generators, ethylene absorbers and the like, as well as water treatment systems to obtain potable water (e.g., via filtration). It will be appreciated that while the necessary service conduits and additional information conduits to perform these additional functions are not illustrated, they are part of a totally integrated atmospheric system for perishable goods containers 3.

Figure 3:
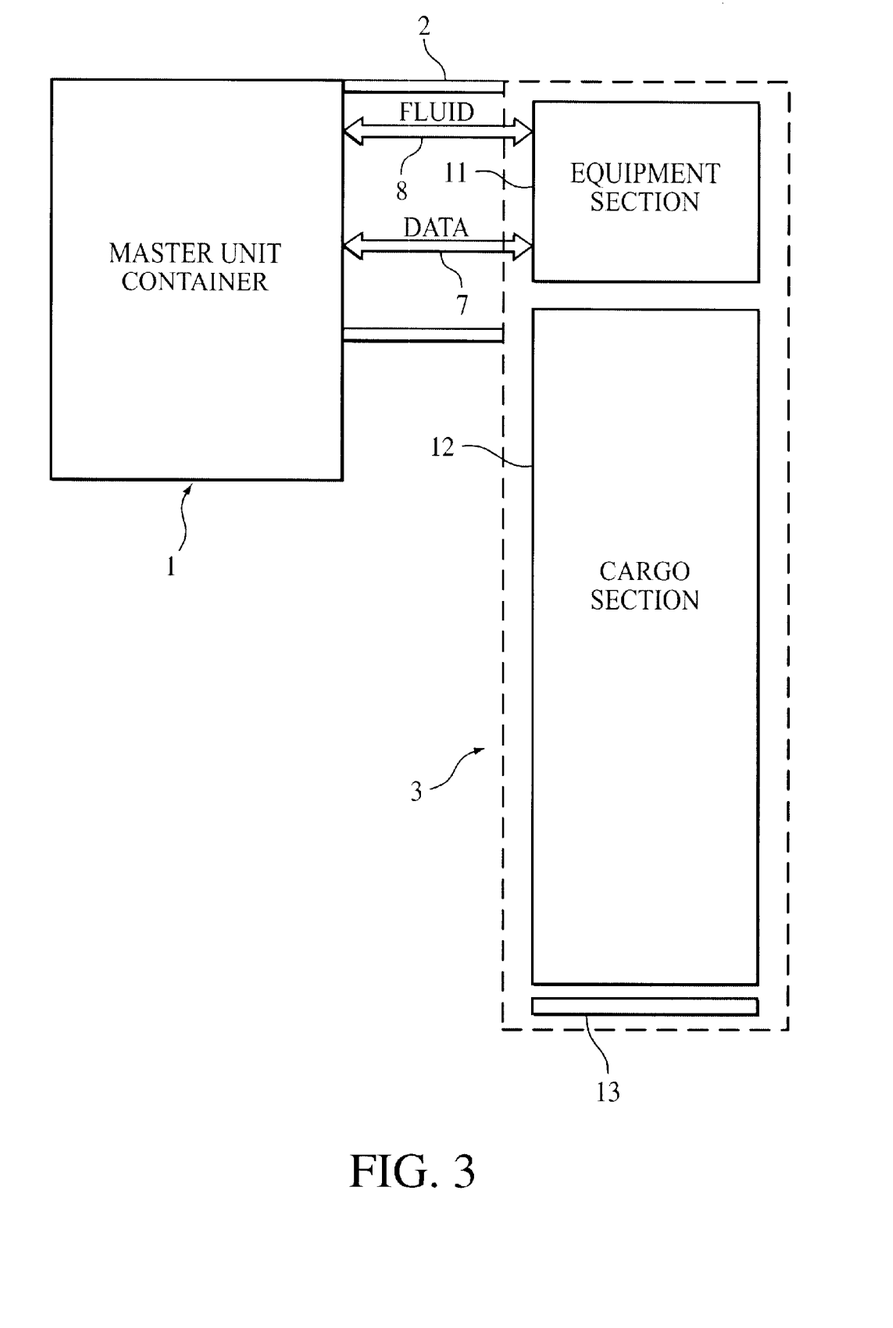
FIG. 3 is a block diagram of a portable perishable goods container, in accordance with a preferred embodiment of the present invention.

FIG. 3 shows a block diagram of a typical commercially available perishable goods containers 3 designed for refrigerated transport. For instance, perishable goods container 3 may take the form of a standard refrigeration container. Container 3 is generally comprised of an equipment section 11 and a cargo section 12. Cargo section 12 has a closeable opening 13 at one end thereof for loading cargo into and out of cargo section 12. Tightly sealing doors (not shown) cover opening 13 and may be augmented by a flexible barrier. Cargo section 12 occupies the main volume of the container 3. A series of drains, ducts, vents and returns (not shown) may be variously arranged in the flooring and ceiling of container 3 for atmospheric circulation. An example of such arrangements are as shown in Rath (U.S. Pat. No. 4,003,728). In addition, ducts may be located in a partition or wall separating equipment section 11 and cargo section 12, as will be explained below.

FIG. 3 also shows umbilical cord 2, which includes data line 7 for information flow, and fluid line 8 for fluid flow (e.g., water, gas, propellants, samples, drain returns, and the like) between containers 1 and 3. As indicated above, umbilical cord 2 is attached by couplers to containers 1 and 3. The couplers interface with I/O ports on master unit container 1 and perishable goods container 3. Accordingly, umbilical cord 2 may be conveniently detached to facilitate the separation of perishable goods containers 3 from master unit container 1.

Figure 4:
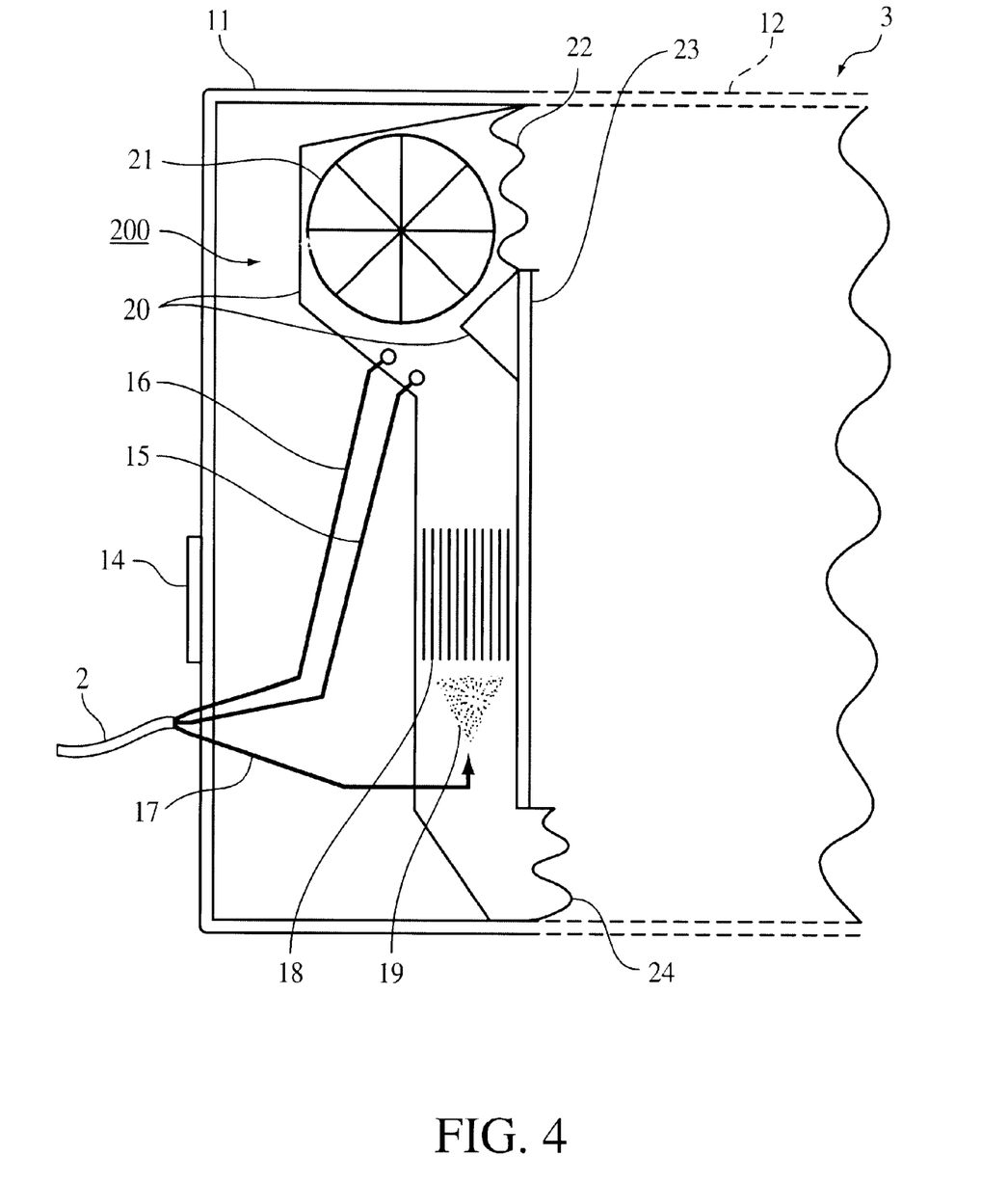
FIG. 4 is a diagrammatic illustration of components of a humidification system installed into a duct system of a commercially available portable perishable goods container.

FIG. 4 provides a diagrammatic view of equipment section 11 as attached to cargo section 12 of perishable goods container 3. Equipment section 11 houses components of humidification system 200. A partition or wall 23 separates equipment section 11 from cargo section 12. In addition, an access panel 14 is provided to allow convenient access to the components housed in equipment section 11 without having to enter cargo section 12.

Equipment section 11 is generally comprised of a humidity sensor (e.g., a humidistat) 15, a flow sensor 16, a sprayer system 17, a heat exchanger 18, a circulating fan or blower unit 21, and a plurality of ducts 20, 22 and 24. Humidity sensor 15, flow sensor 16 and sprayer system 17 interface with master unit container 1 via umbilical cord 2.

Ducts 22 and 24 extend through partition wall 23 between equipment section 11 and cargo section 12. Duct 22 is located at the upper end of partition wall 23, near the ceiling of cargo section 12. Duct 24 is located at the lower end of partition wall 23, near the floor of cargo section 12.

In a preferred embodiment, warmer atmospheric gas (i.e., air) is collected through a series of returns and duct (not shown) located along the top of cargo section 12, and is passed through duct 22 to blower unit 21. Blower 21 draws the atmospheric gas through duct 22, and directs the atmospheric gas through duct 20, where it passes through heat exchanger 18 (which removes heat from the atmospheric gas), and back through duct 24 where it reenters cargo section 12. The atmospheric gas entering cargo section 12 is dispensed to the cargo located therein through an area array of ducts and vents (not shown).

Heat exchanger 18 includes a motor and compressor (not shown), and associated connections and sensors (not shown) for providing controlled refrigeration. Accordingly, heat exchanger 18 acts as a temperature control cooling system in most situations, as will be described in detail below. However, there are situations where heat exchanger 18 also supplies heat to keep the perishable cargo from freezing. Accordingly, heat exchanger 18 may also act as a temperature control heating system. Such modifications are considered within the scope of the instant invention which controls the humidity in combination with any other necessary environmental or atmospheric conditions.

Sprayer system 17 delivers a finely divided mist or atomized fog of water (spray 19) into the refrigerated stream of atmospheric gas in which it is readily vaporized to humidify the stream of atmospheric gas. One end of sprayer system 17 is connected to umbilical cord 2 while the other end extends through duct 20. Sprayer system 17 also includes valves, relays, filters, pumps, etc. and other hardware for operation and control of the spray (not shown). Sprayer system 17 may take the form of any suitable high efficiency system which delivers uniformly atomized water, such as system using a compressed gas driven nozzle, a pressurized water apparatus, an ultrasonic spray nozzle, or the like. It should be appreciated that sprayer system 17 may include a plurality of spray nozzles, wherein master unit container 1 has the ability to activate one or more of the nozzles, or to deactivate one or more of the nozzles if it becomes defective in operation. This allows for significant improvements in reliability, and minimizes the need for immediate servicing.

Various humidity injection processes are suitable for use with the present invention. These humidity injection processes include high pressure water atomization, gas assist atomizer, and gas assist atomizer with re-circulation of atmosphere. The process referred to as high water pressure atomization will now be described in detail with reference to FIG. 5. In this process, potable water is filled manually or automatically into a storage vessel T-1. A level switch high (LSH) may be provided to automate an auto-refill system. In addition, a level switch low (LSL) may be provided to alarm an operator or cut off pump P-1 to avoid damage. Water is pumped out of T-1 when necessary to maintain a minimum pressure in a bladder tank T-2. When pressure in T-2 falls below a preset level as measured by pressure switch PS, pump P-1 is activated. As the pressure rises to a preset level also determined by PS, pump P-1 stops. The water is filtered through a filter F-1 to remove particles and suspended solids (minerals) through a reverse osmosis membrane RO-1. It should be understood that the foregoing processing steps are generic, and are intended to filter the incoming water as necessary to meet the needs of the nozzle design. Moreover, it should be appreciated that proper operation may require a chemical treatment step to prevent the buildup of algae, bacteria, and the like.

Figure 5:
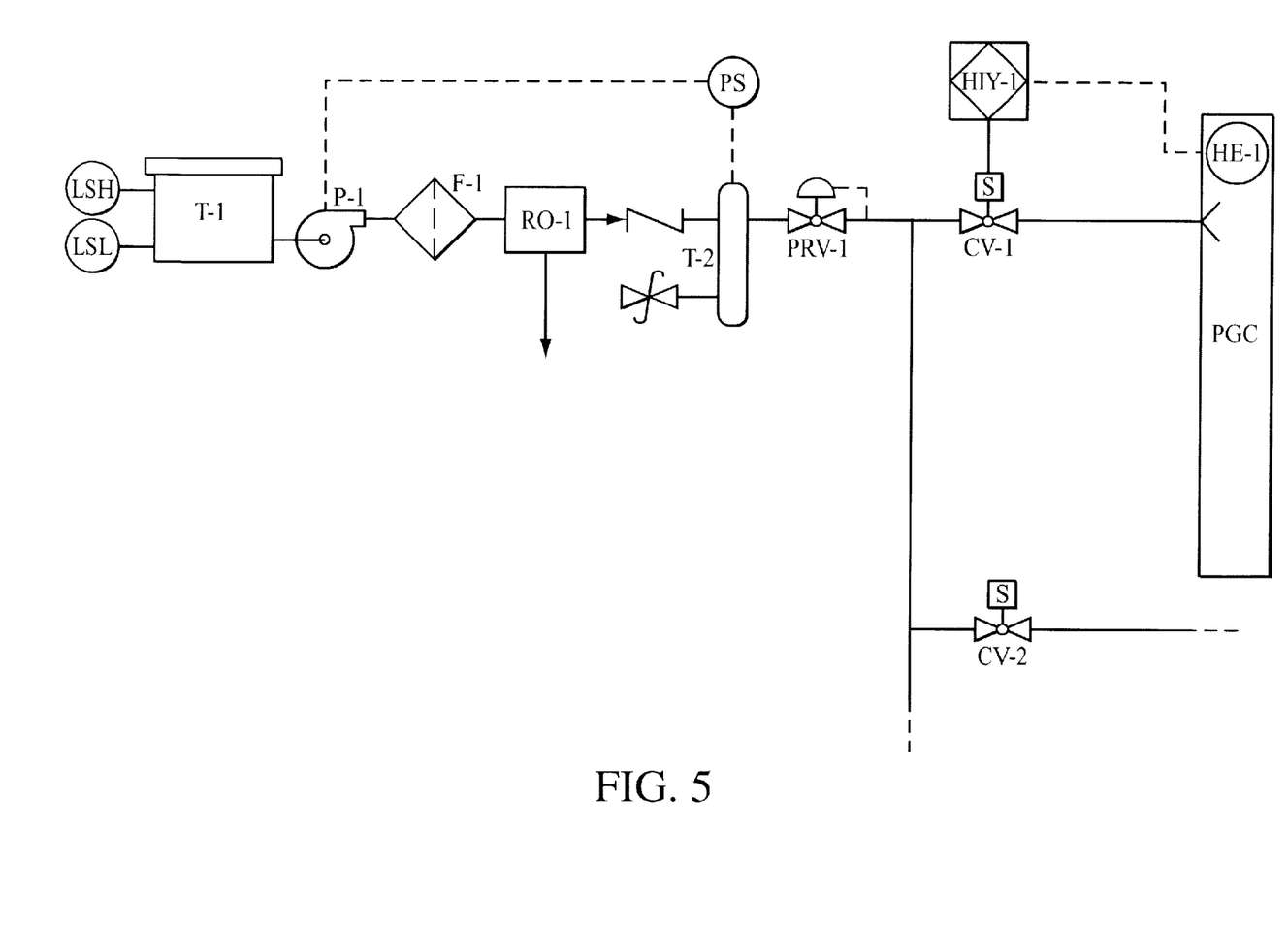
FIG. 5 is a diagram illustrating humidity control using a high pressure atomizer.

The high pressure water in bladder tank T-2 is then regulated by a water pressure regulator PRV-1 before being distributed to a solenoid manifold CV-1, CV-2. The setting on PRV-1 is set to an appropriate pressure to meet the needs of the nozzle design. The humidity level in the perishable goods container (PGC) is sensed by a humidity element HE-1. Output from humidity element HE-1 is fed to a controller HIY1. In a preferred embodiment, controller HIY-1 may take the form of a single-loop controller, or a multi-loop PLC. As the actual humidity falls below a humidity level setpoint, CV-1 is activated to allow mist into the airstream. The high pressure water flows through the spray nozzle. The spray nozzle processes the water as follows: water flows through a small orifice (approximately 0.006 to 0.025" diameter), onto an impingement head, and is atomized.

It should be understood that an interlock with the circulation fan of PGC is not shown. This interlock precludes the addition of mist into PGC when the circulation fan is off. Also not shown are any controlled atmosphere sensors, or equipment. The fluid stream labeled as "container sample" is fluid pulled from PGC and sent to the system located in the master unit container. It should be noted that the fluid stream "N2 supply" traveling from the master unit container to PGC may be nitrogen, air, CO2 or other gas, as required.

Advantages of the foregoing spray nozzle configuration and process for humidity injection into a controlled atmosphere space is that it is atmosphere-neutral; the quantity of gasses displaced by the injection of water by this method is negligible, therefor the balance of gasses is not upset. Compared to gas assisted techniques, high pressure atomizing systems probably have a net energy advantage, depending on the pressure of operation. Disadvantages of the foregoing process are that due to the nozzle's small orifice size, the particulate quality of water is more critical to proper operation.

Figure 6:
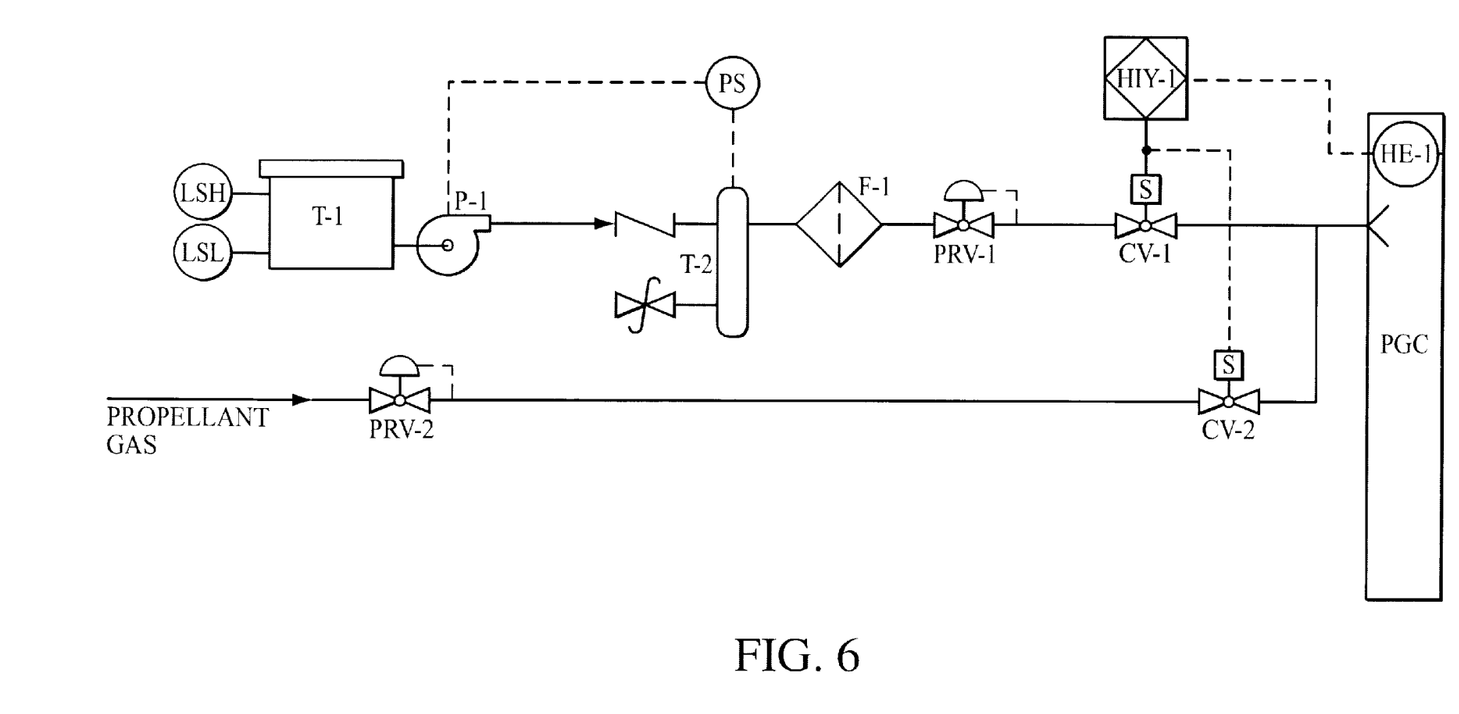
FIG. 6 is a diagram illustrating humidity control using a gas assist atomizer.

The process referred to as gas assist atomizer will now be described in detail with reference to FIG. 6. This system has all the same details on the tanks, level switches, water treatment, pump, pressure switch control, and control elements HE-1, HIY-1, as described above in connection with FIG. 5. With a gas assist nozzle, a water stream and a high velocity gas jet meet at the nozzle face and cause the water to be atomized. The water pressure regulator PRV-1 is set to accommodate the specific nozzle design. To minimize the upset of the atmosphere, nitrogen may be used instead of air as the propellant. When additional water is called for by controller HIY-1, both valves CV-1 (water) and CV-2 (propellant) are opened simultaneously.

For applications where controlled atmosphere is being applied in conjunction with humidity control, the propellant gas required for atomization dilutes the PGC's atmosphere with nitrogen (which has negative effects for perishables that benefit from high CO2 levels).

Figure 7:
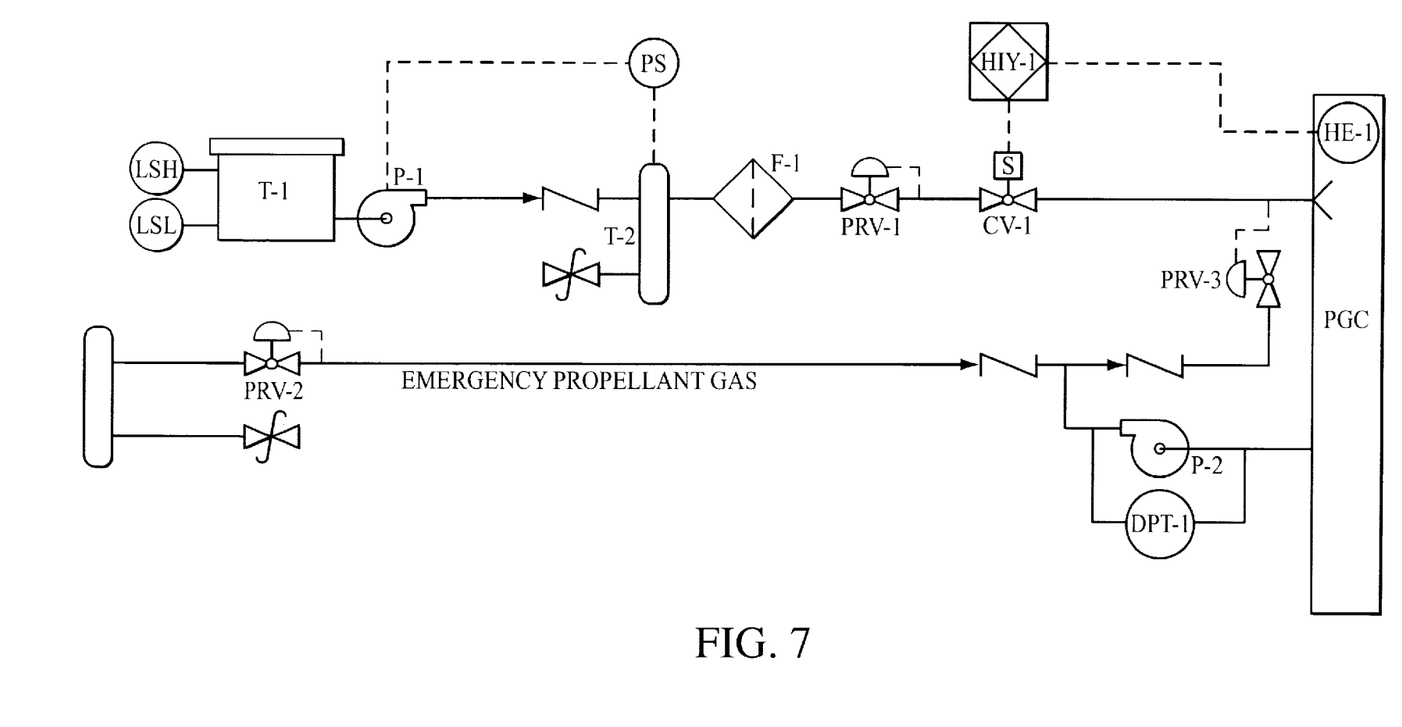
FIG. 7 is a diagram illustrating humidity control using a gas assist atomizer with re-circulation.

The process referred to as gas assist atomizer with re-circulation will now be described in detail with reference to FIG. 7. This process is very similar to the gas assist atomizer described above, uses the same nozzle, with the addition of a re-circulation pump P-2 (e.g., a compressor). When called upon by HIY-1 to add mist to PGC, pump P-2 will start and generate a high pressure gas for atomization in the nozzle. Since P-2's suction comes from the PGC atmosphere, this process is atmosphere-neutral. DPT-1 is a safety interlock to pump P-2. The re-circulation stream could be used for other processes in the future, ethylene and/or CO2 scrubbing.

In accordance with a preferred embodiment of the present invention, spray 19 is introduced to the stream of atmospheric gas after the cooling operation by heat exchanger 18, in order to maximize energy efficiency. However, it will be appreciated that spray 19 may alternatively be introduced to the stream of atmospheric gas before the cooling operation. It should be appreciated that water use is optimized based upon the selected nozzle location and orientation, as well as the selected humidification process (e.g., high pressure water atomization, gas assisted, and gas assisted with re-circulation of propellant).

It is also to be understood that in situations where the cargo container will be in excessively low temperature environments, that which is below the desired interior temperature of the cargo or below freezing, heat needs to be supplied to the sprayer system to prevent freezing of the water. Heat from the compressor which drives the heat exchanger can supply some of the necessary heat; however, one preferred embodiment of the instant invention is to provide an independent source of heat to the sprayer system including any associated water valves from an electrical heater that traces the spray assembly. This specific embodiment is especially important on certain overland routes during winter seasons.

It will be appreciated that humidification system 200 of the present invention maintains the relative humidity in cargo section 12 of perishable goods containers 3 at a level above 90%. In a preferred embodiment the relative humidity is maintained at a level greater than 95% in cargo section 12, since this humidity level is optimum for many perishable goods such as fish, many meat products, cut vegetables and most fruits.

Flow sensor 16 detects when the atmospheric gas is being circulated by blower unit 21, and preferably takes the form of an airflow probe such as manufactured by Air Monitor Corp. Alternatively, circulation fan motor contacts, or control signals from the refrigeration system could also be used as a means for detecting flow. In this regard, sprayer system 17 is operated only when the atmospheric gas is being circulated by blower unit 21. It will be appreciated that there are other suitable ways to link sprayer system 17 with blower unit 21 so that sprayer system 17 is operated only when the atmosphere is being circulated. In some cases it may be desirable for the atmospheric gas to be continuously circulated with sprayer system 17 and heat exchanger 18 (cooling assembly) being operated only as needed to maintain the preferred atmospheric conditions around the perishable goods located in cargo section 12.

Humidity sensor 15 is located in the stream of atmospheric gas prior to heat exchanger 18, to determine the relative humidity in the atmospheric gas prior to cooling and forcing precipitation of humidity at the lower temperature. Moreover, it is desirable to locate one or more humidity sensors 15 in cargo section 12. These humidity sensors could replace the humidity sensor located in equipment section 11, or simply augment its performance. It is within the scope of the instant invention to interface any of humidity sensors 15 directly with sprayer system 17, although it is preferable to route the output from the humidity sensors 15 to master unit 1 for better control and problem detection. It should be appreciated that a plurality of humidity sensors 15 may be used to provide redundancy, wherein master unit 1 has the ability to activate one or more of the humidity sensors, or to deactivate one or more of the humidity sensors if it becomes defective in operation. This allows for significant improvements in reliability, and minimizes the need for immediate servicing.

As indicated above, an access panel 14 is provided in the front of equipment section 11. In a similar way, it or additional access panels 14 are suitably located on the sides of equipment section 11. This allows for convenient installation or servicing of the humidification system components located in equipment section 11 without the need to unload and enter cargo section 12. It will be appreciated that servicing may include such tasks as cleaning, repairing or replacing a spray nozzle or a humidity sensor 17.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A centralized humidification controlled container system comprising:
   (a) one or more detachable portable goods containers suitable for confining perishable goods;
   (b) a portable detachable master unit container which includes controlling equipment for processing data and a source of humidification water; and
   (c) connecting means for connecting the master unit container to each of the goods containers to provide a path for transferring data and fluid therebetween.

2. A centralized humidification controlled container system of claim 1, wherein said goods containers are shared with other associated controlled atmospheric systems.

3. A centralized humidification controlled container system of claim 1, wherein said master unit container is shared with other associated controlled atmospheric systems.

4. A centralized humidification controlled container system of claim 1, wherein said connecting means is shared with other associated controlled atmospheric systems.

5. A centralized humidification controlled container system of claim 1, wherein said master unit container shares an electrical power distribution system.

6. A centralized humidification container system according to claim 2, wherein said other associated controlled atmospheric system includes a temperature control system.

7. A centralized humidification container system according to claim 2 where said other associated controlled atmospheric system includes a gas control system for controlling one or more of the gases selected from: oxygen, nitrogen, carbon dioxide and ethylene.

8. A centralized humidification container system according to claim 3 wherein said other controlled atmospheric system includes a gas control system for controlling one or more of the gases selected from: oxygen, nitrogen, carbon dioxide and ethylene.

9. A centralized humidification container system according to claim 4 wherein said other controlled atmospheric system includes a gas control system for controlling one or more of the gases selected from: oxygen, nitrogen, carbon dioxide and ethylene.

10. A centralized humidification container system according to claim 1 wherein relative humidity in said goods containers is maintained above 90%.

11. A centralized humidification container system according to claim 1 where relative humidity in said goods containers is maintained above 95%.

12. A centralized humidification container system according to claim 1 wherein said system further includes one or more spraying means for delivering moisture to a controlled atmospheric system flow stream.

13. A portable master unit container for humidifying contents of one or more associated goods containers, said portable master unit container comprising:
   a source of humidification water; and
   controller means for controlling the humidity in said associated goods containers, wherein said master unit container is detachably connected with one or more associated goods containers by a stress tolerant umbilical cord.

14. A portable master unit container according to claim 13, wherein said humidification means are located in said one or more portable goods containers for transporting and holding perishable goods.

15. A portable humidification system for providing relative humidity of 90% or greater, comprising:
   a fluid reservoir for providing a supply of water;
   control means for controlling operation of the humidification system;
   blower means for transferring atmospheric gas from a perishable goods storage area and directing the removed atmospheric gas through the humidification system for processing thereby, and returning the processed atmospheric gas to the perishable goods storage area;
   first sensor means for sensing the humidity of the atmospheric gas; temperature control means for modifying the temperature of the atmospheric gas; sprayer means for delivering water from the fluid reservoir to the atmospheric gas; and
   wherein said fluid reservoir and said control means are located in a master unit container, and said blower means, said first sensor means, said temperature control means, and said sprayer means are located in a perishable goods container, said humidification system further comprising connection means for transferring water and data between the master unit container and the perishable goods container.

16. A humidification system according to claim 15, wherein said data includes data generated by the first sensor means.

* * * * *